United States Patent
Toyama

(10) Patent No.: US 11,243,128 B2
(45) Date of Patent: Feb. 8, 2022

(54) SENSOR CAPABLE OF ENSURING THAT A SENSOR HOUSING HAS SUFFICIENT RIGIDITY

(71) Applicant: JTEKT CORPORATION, Osaka (JP)

(72) Inventor: Yuichi Toyama, Owariasahi (JP)

(73) Assignee: JTEKT CORPORATION, Osaka (JP)

(*) Notice: Subject to any disclaimer, the term of this patent is extended or adjusted under 35 U.S.C. 154(b) by 132 days.

(21) Appl. No.: 16/727,729

(22) Filed: Dec. 26, 2019

(65) Prior Publication Data
US 2020/0217731 A1    Jul. 9, 2020

(30) Foreign Application Priority Data
Jan. 9, 2019 (JP) .............................. JP2019/001846

(51) Int. Cl.
*G01L 3/10* (2006.01)
*B62D 6/10* (2006.01)
*G01D 5/14* (2006.01)

(52) U.S. Cl.
CPC ............... *G01L 3/104* (2013.01); *B62D 6/10* (2013.01); *G01D 5/145* (2013.01)

(58) Field of Classification Search
CPC ........... G01L 3/104; G01D 5/145; B62D 6/10
USPC ...................................... 73/862.331–862.338
See application file for complete search history.

(56) References Cited

U.S. PATENT DOCUMENTS

| 7,406,884 B2* | 8/2008 | Jerems ................... G01L 3/101 73/862.331 |
| 7,415,898 B2* | 8/2008 | Ishihara .................. B62D 6/10 73/862.331 |
| 7,509,883 B2 | 3/2009 | Murakami et al. |
| 8,015,885 B2* | 9/2011 | Arita ....................... G01L 3/104 73/862.333 |
| 2007/0157740 A1 | 7/2007 | Jerems et al. |
| 2008/0250873 A1 | 10/2008 | Prudham et al. |
| 2016/0153850 A1 | 6/2016 | Takahashi et al. |
| 2017/0211995 A1* | 7/2017 | Yamada .................. G01L 3/104 |
| 2021/0010880 A1* | 1/2021 | Toyama ............... G01D 11/245 |

FOREIGN PATENT DOCUMENTS

| DE | 10 2004 023 801 A1 | 8/2005 |
| DE | 10 2015 221 756 A1 | 6/2016 |
| JP | 5090162 B2 | 12/2012 |

OTHER PUBLICATIONS

May 7, 2020 Extended Search Report issued in European Patent Application No. 20150515.3.

* cited by examiner

*Primary Examiner* — Octavia Hollington
(74) *Attorney, Agent, or Firm* — Oliff PLC

(57) ABSTRACT

A sensor includes a permanent magnet mounted on a shaft, a magnetic yoke, a magnetism collecting ring, a circuit board, and a sensor housing through which the shaft is inserted. The sensor housing has a box-shaped accommodating chamber accommodating at least the circuit board via an opening that opens in a direction crossing an axial direction of the shaft. A reinforcing member connecting two wall surfaces of the accommodating chamber that face each other in the axial direction of the shaft is provided in the accommodating chamber.

4 Claims, 7 Drawing Sheets

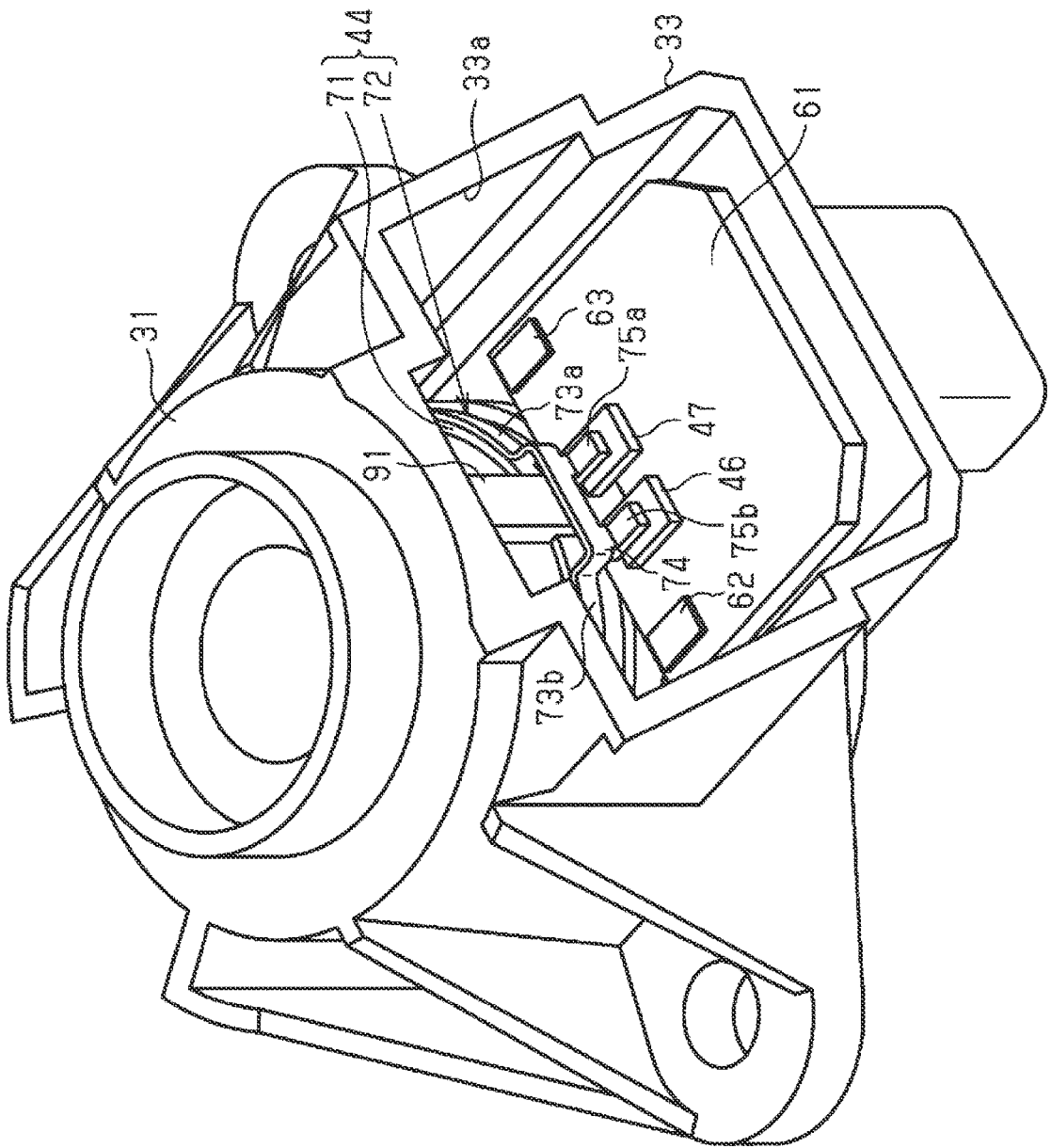

SENSOR CAPABLE OF ENSURING THAT A SENSOR HOUSING HAS SUFFICIENT RIGIDITY

INCORPORATION BY REFERENCE

The disclosure of Japanese Patent Application No. 2019-001846 filed on Jan. 9, 2019 including the specification, drawings and abstract is incorporated herein by reference in its entirety.

BACKGROUND

1. Technical Field

The disclosure relates to sensors.

2. Description of Related Art

Japanese Patent No. 5090162 (JP 5090162 B) discloses a sensor that detects torsion of a steering shaft. The sensor disclosed in JP 5090162 B has a rotor structure, a stator structure, and a collector structure. The rotor structure includes magnets. The stator structure has two stator rings facing each other in an axial direction. The collector structure has two collectors having two surfaces that define measurement clearances in which Hall probes are disposed.

When the steering shaft is torsionally deformed, the relative position in the rotation direction between the magnets and the stator rings changes. The magnetic flux density guided from the magnets into the measurement clearances between the collectors through the stator rings changes accordingly. The Hall probes are mounted on a circuit board. The Hall probes detect the magnetic flux density guided into the measurement clearances between the collectors. The sensor detects torsion of the steering shaft based on the change in the magnetic flux density detected by the Hall probes.

SUMMARY

It is assumed that the components of the sensor disclosed in JP 5090162 B are accommodated in a sensor housing. In this case, for example, an opening may be formed in the sensor housing and the stator rings, the collectors, and the circuit board with the Hall probes mounted thereon may be mounted in the sensor housing through the opening. However, forming an opening in the sensor housing may reduce rigidity of the sensor housing.

The disclosure provides a sensor capable of ensuring that a sensor housing has sufficient rigidity even when the sensor housing has an opening.

An aspect of the disclosure is a sensor including: a permanent magnet mounted on a shaft that is subjected to detection by the sensor such that the permanent magnet is rotatable with the shaft; a magnetic yoke configured so that a rotational position of the magnetic yoke relative to the permanent magnet changes according to torsion of the shaft; a magnetism collecting ring configured to surround the magnetic yoke and collect a magnetic flux from the magnetic yoke; a circuit board on which a magnetic sensor that detects the magnetic flux collected by the magnetism collecting ring is mounted; and a sensor housing through which the shaft is inserted and that accommodates the permanent magnet, the magnetic yoke, the magnetism collecting ring, and the circuit board. The sensor housing has an accommodating chamber accommodating at least the circuit board via an opening that opens in a direction crossing an axial direction of the shaft. The accommodating chamber have a box-shape. A reinforcing member connecting two wall surfaces of the accommodating chamber that face each other in the axial direction of the shaft is provided in the accommodating chamber.

A sensor housing sometimes has a common opening through which a circuit board and other components are mounted in the sensor housing. Since the circuit board and other components are accommodated and mounted in the sensor housing through the opening, the opening may need to be wide. As the opening gets wider and larger, rigidity of the sensor housing may be reduced and the sensor housing needs to be reinforced. In this regard, according to the above configuration, the reinforcing member is provided in the accommodating chamber of the sensor housing. The sensor housing is therefore less likely to be deformed. The sensor housing therefore has sufficient rigidity even when the sensor housing has an opening.

In the above sensor, the magnetism collecting ring may include a first magnetism collecting ring and a second magnetism collecting ring that are arranged next to each other in the axial direction of the shaft. Each of the first magnetism collecting ring and the second magnetism collecting ring may include a first portion surrounding the magnetic yoke and a second portion protruding outward in a radial direction of the first portion, the second portions may face each other in the axial direction of the shaft, and the magnetic sensor mounted on the circuit board may be interposed between the second portions. The first magnetism collecting ring may be located closer to a surface of the circuit board on which the magnetic sensor is mounted. The first portion and the second portion of the first magnetism collecting ring may be separate members. It is preferable that the first portion of the first magnetism collecting ring be mounted at a position inside the reinforcing member, and the second portion of the first magnetism collecting ring be attached to the first portion of the first magnetism collecting ring from outside of the reinforcing member such that the reinforcing member is interposed between the first portion and the second portion.

With this configuration, the first portion of the first magnetism collecting ring can be mounted in advance in the sensor housing. It is therefore not necessary to mount the first portion of the first magnetism collecting ring in the sensor housing through the opening. Only the second portion of the first magnetism collecting ring need be attached to the first portion from the outside of the reinforcing member after the circuit board is mounted in the accommodating chamber. Accordingly, the first magnetism collecting ring can be appropriately mounted in the sensor housing even when the reinforcing member is present in the accommodating chamber.

In the above sensor, when the sensor housing is viewed from the opening side, the reinforcing member may be located at a middle position in a width direction of the accommodating chamber, the width direction being perpendicular to the axial direction of the shaft.

This configuration improves rigidity of the sensor housing in a balanced manner. In the above sensor, a rotation angle sensor that detects a rotation angle of the shaft may be mounted in the sensor housing.

With this configuration, not only torque acting on the shaft but also the rotation angle of the shaft can be detected with a single sensor. In the above sensor, the shaft may be a pinion shaft meshing with a steered shaft that steers a steered wheel of a vehicle.

According to the sensor of the disclosure, the sensor housing has sufficient rigidity even when the sensor housing has an opening.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a perspective view of the housing of the torque sensor of the embodiment in which the circuit board and the magnetism collecting protrusions are mounted.

DETAILED DESCRIPTION OF EMBODIMENTS

Figure 1:
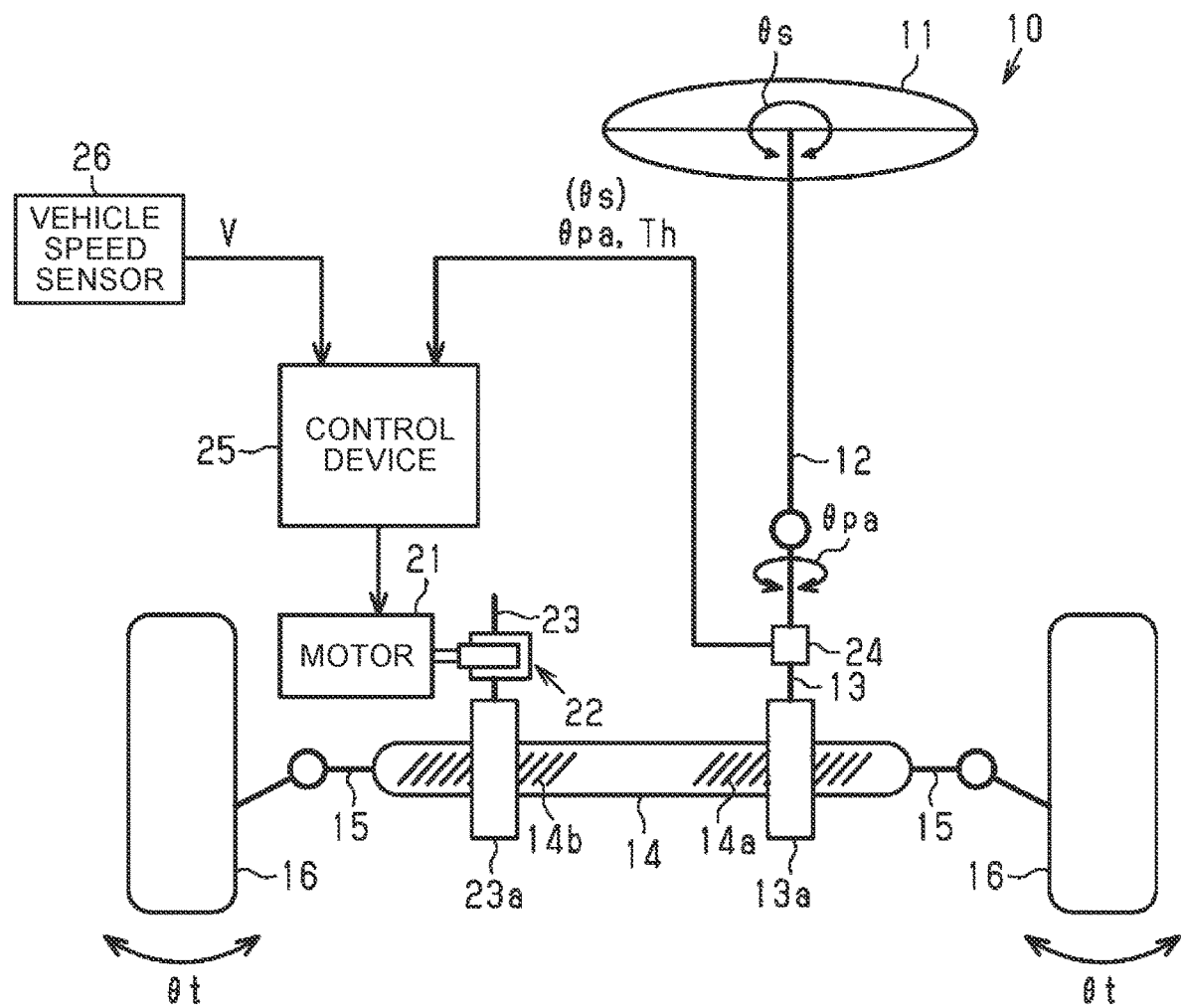
FIG. 1 is a configuration diagram of a steering device having a sensor of an embodiment mounted thereon.

An embodiment in which a sensor is applied to a steering device of a vehicle will be described. As shown in FIG. 1, a steering device 10 of a vehicle includes a steering shaft 12 connected to a steering wheel 11. A pinion shaft 13 is disposed at the opposite end of the steering shaft 12 from the steering wheel 11. A steered shaft 14 extends in a direction crossing the pinion shaft 13, and pinion teeth 13a of the pinion shaft 13 mesh with rack teeth 14a of the steered shaft 14. Right and left steered wheels 16 are connected to respective ends of the steered shaft 14 via tie rods 15.

The steering device 10 includes, as a configuration for generating a steering assist force (assist force), a motor 21, a speed reduction mechanism 22, a pinion shaft 23, a torque angle sensor (hereinafter referred to as "TAS") 24, and a control device 25.

The motor 21 is a source of the steering assist force, and for example, a three-phase brushless motor is used as the motor 21. The motor 21 is connected to the pinion shaft 23 via the speed reduction mechanism 22. Pinion teeth 23a of the pinion shaft 23 mesh with rack teeth 14b of the steered shaft 14. Rotation of the motor 21 is reduced in speed by the speed reduction mechanism 22, and the resultant rotational force is transmitted as a steering assist force from the pinion shaft 23 to the pinion shaft 13 through the steered shaft 14.

The TAS 24 is mounted on the pinion shaft 13 (specifically, a gear housing accommodating the steered shaft 14 and the pinion shaft 13). The TAS 24 is a combination of a torque sensor and a rotation angle sensor. The TAS 24 detects torque applied to the pinion shaft 13 through an operation of rotating the steering wheel 11 as steering torque Th. The TAS 24 also detects a rotation angle θpa of multiple rotations of the pinion shaft 13, which exceeds 360°, as a steering angle θs.

The control device 25 receives the steering torque Th and the steering angle θs both detected by the TAS 24. The control device 25 also receives a vehicle speed V detected by a vehicle speed sensor 26 mounted on the vehicle. The control device 25 performs assist control for generating a steering assist force (assist force) according to the steering torque Th and the vehicle speed V through control of current application to the motor 21. The control device 25 controls power supply to the motor 21 based on the steering torque Th detected by the TAS 24 and the vehicle speed V detected by the vehicle speed sensor 26.

Configuration of TAS

Figure 2:
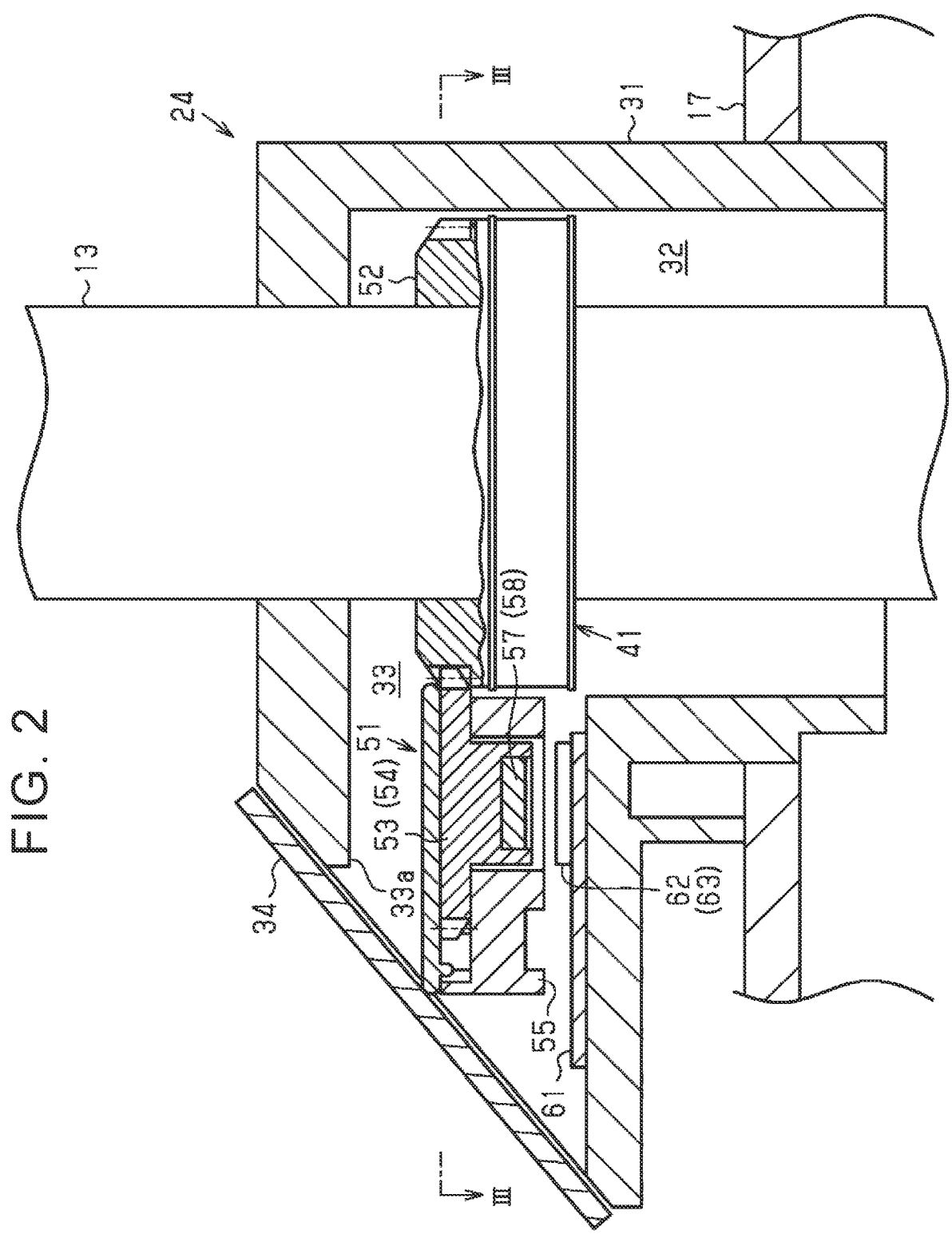
FIG. 2 is a sectional view of a torque angle sensor of an embodiment taken in an axial direction of a pinion shaft.

Next, the configuration of the TAS 24 will be described. As shown in FIG. 2, the TAS 24 has a sensor housing 31. The sensor housing 31 is attached to a gear housing 17 accommodating the steered shaft 14. The sensor housing 31 has an insertion hole 32 and an accommodating chamber 33. The pinion shaft 13 is inserted through the insertion hole 32. Although not shown in the figure, the pinion shaft 13 includes an input shaft on the steering shaft 12 side, an output shaft on the steered shaft 14 side, and a torsion bar connecting the input shaft and the output shaft. The accommodating chamber 33 is in the shape of a box that opens in a direction crossing an axial direction of the pinion shaft 13. The accommodating chamber 33 communicates with the insertion hole 32 and is open to the outside of the sensor housing 31. An opening 33a of the accommodating chamber 33 is closed by a cover 34.

Figure 3:
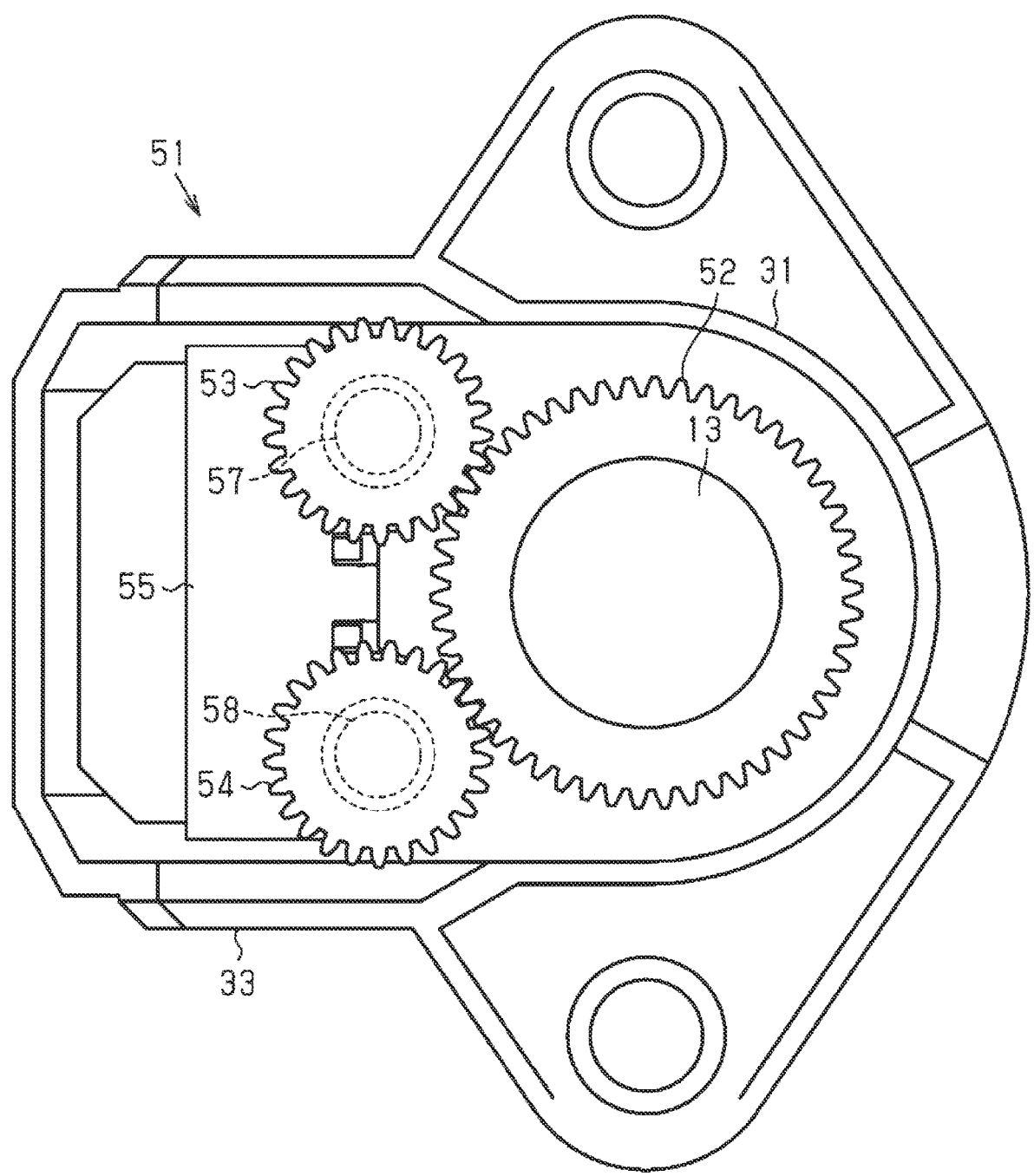
FIG. 3 is a sectional view taken along line in FIG. 2.

A torque sensor 41 and a rotation angle sensor 51 are mounted in the sensor housing 31. As shown in FIG. 3, the rotation angle sensor 51 has a main drive gear 52 and two driven gears 53, 54. The main drive gear 52 is fitted on the input shaft of the pinion shaft 13 such that the main drive gear 52 can rotate with the input shaft of the pinion shaft 13. The two driven gears 53, 54 are rotatably supported in the accommodating chamber 33 of the sensor housing 31 via a support member 55. The two driven gears 53, 54 mesh with the main drive gear 52. Accordingly, when the pinion shaft 13 rotates, the main drive gear 52 also rotates with the pinion shaft 13, and the two driven gears 53, 54 rotate accordingly. The number of teeth is different between the two driven gears 53, 54. Accordingly, when the main drive gear 52 rotates with the pinion shaft 13, the rotation angles of the two driven gears 53, 54 for the rotation angle of the main drive gear 52 are different from each other. Permanent magnets 57, 58 are mounted for the driven gears 53, 54 such that the permanent magnets 57, 58 can rotate with the driven gears 53, 54, respectively.

As shown in FIG. 2, a circuit board 61 is disposed on the inner bottom surface of the accommodating chamber 33 of the sensor housing 31. Two magnetic sensors (only one is shown in FIG. 2) 62, 63 are mounted on the side surface (the upper surface in FIG. 2) on the driven gear 53, 54 side of the circuit board 61. The magnetic sensors 62, 63 face the permanent magnets 57, 58 (only one is shown in FIG. 2) in the axial direction of the insertion hole 32 of the sensor housing 31. Hall sensors or magnetoresistive (MR) sensors are used as the magnetic sensors 62, 63. The magnetic sensors 62, 63 generate electrical signals according to changes in the magnetic field that occur as the driven gears 53, 54 rotate. The control device 25 detects the rotation angle θpa of the pinion shaft 13 as the steering angle θs, based on the electrical signals generated by the magnetic sensors 62, 63.

Figure 4:
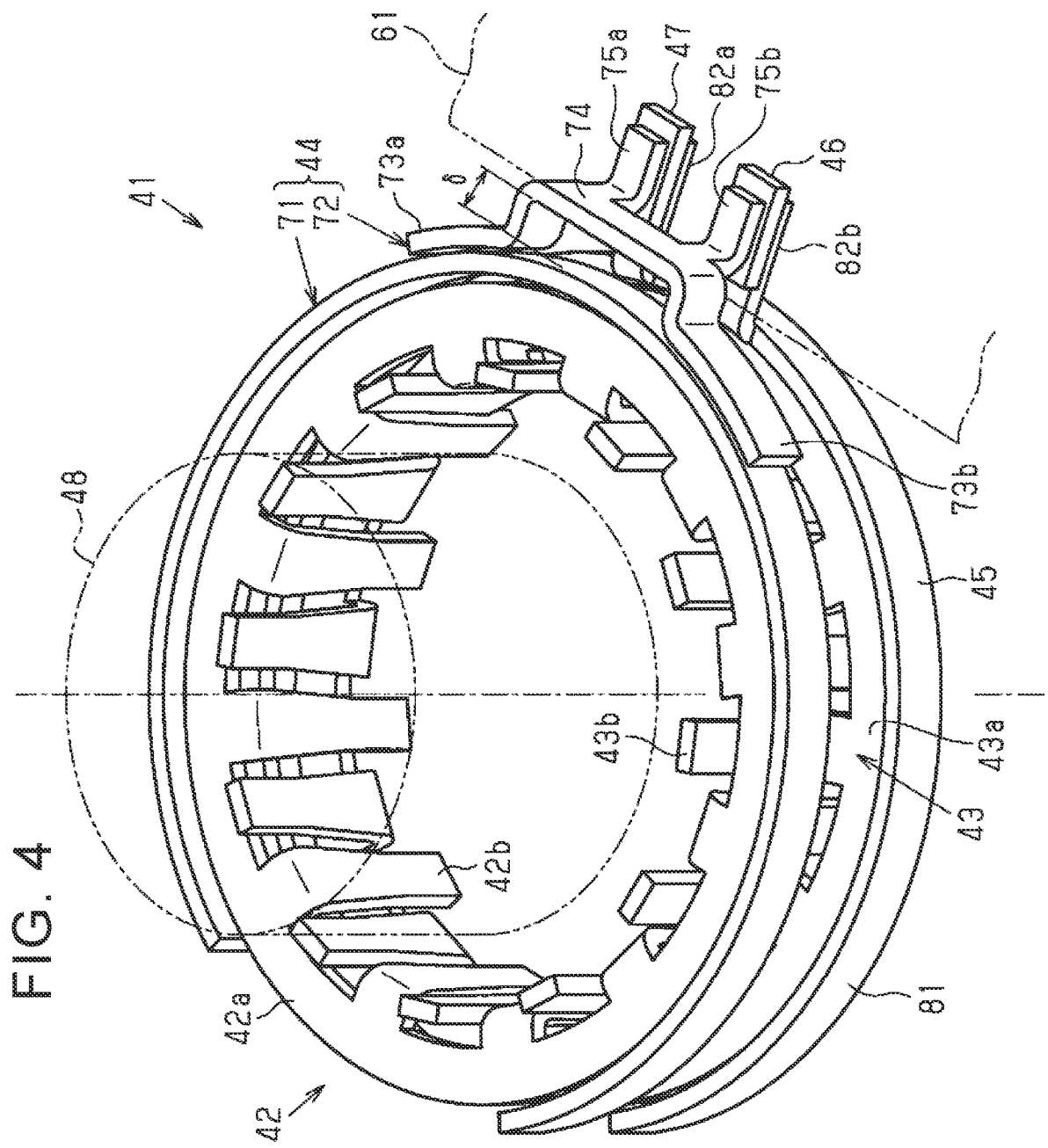
FIG. 4 is a perspective view illustrating the positional relationship between magnetic yokes and magnetism collecting rings in a torque sensor of an embodiment.

As shown in FIG. 4, the torque sensor 41 includes a first magnetic yoke 42, a second magnetic yoke 43, a first magnetism collecting ring 44, a second magnetism collecting ring 45, a first magnetic sensor. 46, a second magnetic sensor 47, and a permanent magnet 48.

The permanent magnet 48 is fixed to the input shaft of the pinion shaft 13. The permanent magnet 48 has a cylindrical shape and has S poles and N poles that are alternately arranged in its circumferential direction. The first magnetic yoke 42 and the second magnetic yoke 43 are arranged next to each other in the axial direction of the pinion shaft 13 (the vertical direction in FIG. 4). The first magnetic yoke 42 and the second magnetic yoke 43 are fixed to the output shaft of the pinion shaft 13 via a holder (not shown). The permanent magnet 48, which is disposed on the pinion shaft 13 such that the permanent magnet 48 can rotate with the pinion shaft 13, is located inside the first magnetic yoke 42 and the second magnetic yoke 43. The first magnetic yoke 42 and the second magnetic yoke 43 form a magnetic circuit according to the magnetic field of the permanent magnet 48.

The first magnetic yoke 42 has an annular plate-like annular portion 42a and a plurality of plate-like teeth 42b. The teeth 42b are located at regular intervals along the inner peripheral edge of the annular portion 42a. The teeth 42b extend in the axial direction of the pinion shaft 13. Like the first magnetic yoke 42, the second magnetic yoke 43 has an annular plate-like annular portion 43a and a plurality of teeth 43b. The teeth 42b of the first magnetic yoke 42 and the teeth 43b of the second magnetic yoke 43 extend toward opposite sides in the axial direction of the pinion shaft 13 and are alternately located in the circumferential direction.

The first magnetism collecting ring 44 and the second magnetism collecting ring 45 are arranged next to each other in the axial direction of the pinion shaft 13. The first magnetism collecting ring 44 and the second magnetism collecting ring 45 are mounted in the sensor housing 31. The first magnetism collecting ring 44 is disposed so as to surround the first magnetic yoke 42. The second magnetism collecting ring 45 is disposed so as to surround the second magnetic yoke 43. The first magnetism collecting ring 44 guides a magnetic flux from the first magnetic yoke 42. The second magnetism collecting ring 45 guides a magnetic flux from the second magnetic yoke 43.

The first magnetism collecting ring 44 has a first portion 71 and a second portion 72. The first portion 71 is in a C shape that is curved along the outer peripheral surface of the first magnetic yoke 42. The second portion 72 is formed by plastically deforming a single plate material. The second portion 72 has two fixed portions 73a, 73b, a connecting portion 74, and two magnetism collecting protrusions 75a, 75b. The two fixed portions 73a, 73b are portions that are attached to the outer peripheral surface of the first portion 71. The two fixed portions 73a, 73b are curved along the outer peripheral surface of the first portion 71. The connecting portion 74 is a portion connecting the two fixed portions 73a, 73b. There is clearance 8 between the inner surface of the connecting portion 74 and the outer peripheral surface of the first portion 71. The two magnetism collecting protrusions 75a, 75b are formed at the side edge on the second magnetism collecting ring 45 side (the lower side in FIG. 4) of the connecting portion 74. The two magnetism collecting protrusions 75a, 75b extend outward in a radial direction of the first portion 71.

The second magnetism collecting ring 45 has a body 81 as a first portion and two magnetism collecting protrusions 82a, 82b as second portions. The body 81 is in a C shape that is curved along the outer peripheral surface of the second magnetic yoke 43. The two magnetism collecting protrusions 82a, 82b are provided on the edge of the first magnetism collecting ring 44 side (the upper side in FIG. 4) of the body 81. The two magnetism collecting protrusions 82a, 82b extend outward in the radial direction of the body 81. The two magnetism collecting protrusions 82a, 82b face the two magnetism collecting protrusions 75a, 75b of the first magnetism collecting ring 44 in the axial direction of the pinion shaft 13 (the vertical direction in FIG. 4).

The first magnetic sensor 46 and the second magnetic sensor 47 are mounted on the circuit board 61. The first magnetic sensor 46, the second magnetic sensor 47, and portions of the circuit board 61 on which the first magnetic sensor 46 and the second magnetic sensor 47 are mounted are interposed between the magnetism collecting protrusions 75a, 75b and the magnetism collecting protrusions 82a, 82b. The first magnetic sensor 46 and the second magnetic sensor 47 detect the magnetic flux guided to the first magnetism collecting ring 44 and the second magnetism collecting ring 45.

When the torsion bar of the pinion shaft 13 is torsionally deformed through operation of the steering wheel 11, the relative positions in the rotation direction between the permanent magnet 48 and the first magnetic yoke 42 and the relative positions in the rotation direction between the permanent magnet 48 and the second magnetic yoke 43 change accordingly. The magnetic flux density guided from the permanent magnet 48 to the first magnetism collecting ring 44 through the first magnetic yoke 42 therefore changes accordingly. The magnetic flux density guided from the permanent magnet 48 to the second magnetism collecting ring 45 through the second magnetic yoke 43 also changes accordingly.

The first magnetic sensor 46 generates an electrical signal according to the magnetic flux leaking between the magnetism collecting protrusion 75a of the first magnetism collecting ring 44 and the magnetism collecting protrusion 82a of the second magnetism collecting ring 45. The second magnetic sensor 47 generates an electrical signal according to the magnetic flux leaking between the magnetism collecting protrusion 75b of the first magnetism collecting ring 44 and the magnetism collecting protrusion 82b of the second magnetism collecting ring 45. The control device 25 detects torque acting on the torsion bar as steering torque, based on the electric signals generated by the first magnetic sensor 46 and the second magnetic sensor 47.

Assembly Procedure of TAS

Next, a procedure of assembling the TAS will be described. When attaching the TAS 24 to the gear housing 17, a subassembly (unit) of the TAS 24 is first assembled. The driven gears 53, 54, the circuit board 61, and the first magnetism collecting ring 44 and the second magnetism collecting ring 45 of the torque sensor 41 are attached to the sensor housing 31 so that the subassembly can be handled integrally with these components. The main drive gear 52 is attached to the input shaft of the pinion shaft 13. The first magnetic yoke 42 and the second magnetic yoke 43 of the torque sensor 41 are attached to the output shaft of the pinion shaft 13. In this state, the tip end of the pinion shaft 13 is inserted through the subassembly of the TAS 24, and the sensor housing 31 is then fixed to the gear housing 17. Assembly of the TAS 24 is thus completed.

Assembly Procedure for TAS Subassembly

Figure 5:
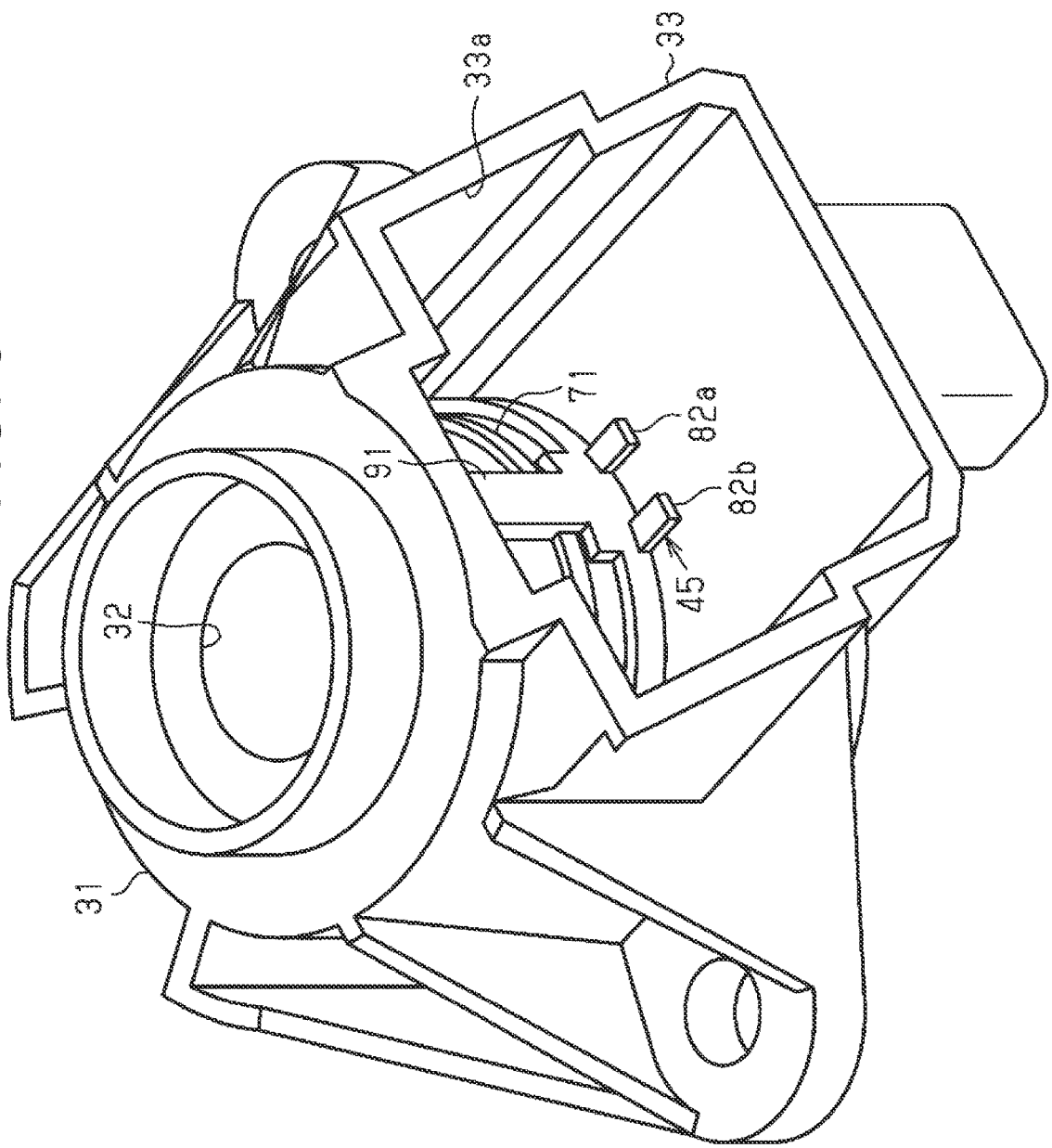
FIG. 5 is a perspective view of a housing of the torque sensor of the embodiment before a circuit board and magnetism collecting protrusions are mounted in the housing.

Next, a procedure of assembling the subassembly of the TAS 24 will be described. As shown in FIG. 5, as a configuration on which the subassembly of the TAS 24 is based, the first portion 71 of the first magnetism collecting ring 44 and the second magnetism collecting ring 45 are integrally mounted in the sensor housing 31. A part of the first portion 71 of the first magnetism collecting ring 44 and the magnetism collecting protrusions 82a, 82b of the second magnetism collecting ring 45 are located in the accommodating chamber 33 and are exposed through the opening 33a.

Figure 6:
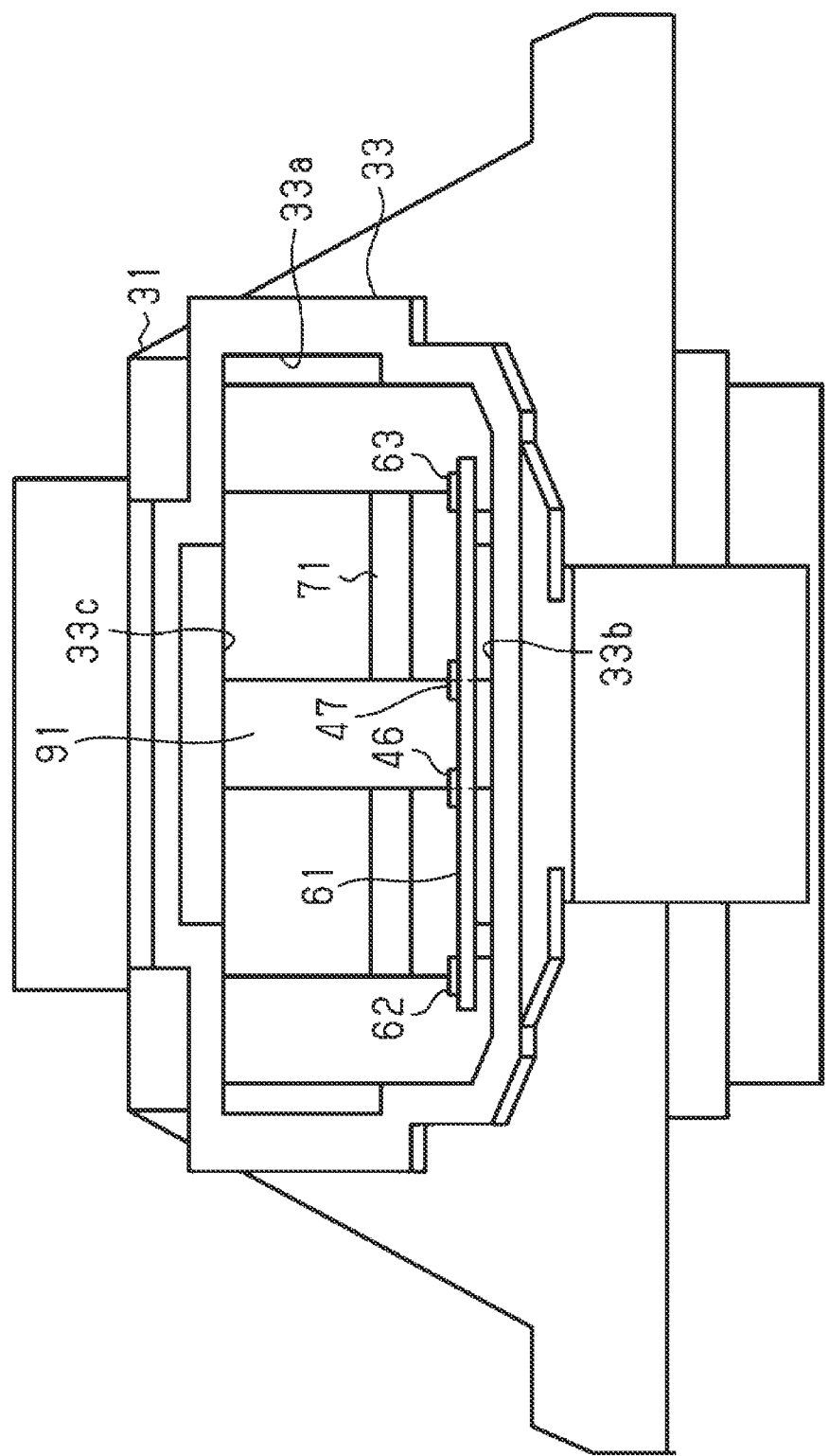
FIG. 6 is a front view of the housing of the torque sensor of the embodiment in which the circuit board is mounted, as viewed from the opening side.

In this state, the circuit board 61 is attached to the inner bottom surface of the accommodating chamber 33 through the opening 33a. As shown in FIG. 6, the circuit board 61 is fixed to the inner bottom surface of the accommodating chamber 33 in such an attitude that the magnetic sensors 62, 63 for the rotation angle sensor 51 and the first and second magnetic sensors 46, 47 for the torque sensor 41 face toward the opposite side of the accommodating chamber 33 from its inner bottom surface (the upper side in FIG. 6).

As shown in FIG. 7, the second portion 72 of the first magnetism collecting ring 44 is then attached to the first portion 71 of the first magnetism collecting ring 44 that is exposed through the opening 33a. The second portion 72 is fixed to the outer peripheral surface of the first portion 71 via the two fixed portions 73a, 73b. The two magnetism collecting protrusions 75a, 75b are kept facing the first magnetic sensor 46 and the second magnetic sensor 47 in a direction perpendicular to the circuit board 61.

Subsequently, the driven gears 53, 54 of the rotation angle sensor 51 are mounted in the accommodating chamber 33, and the opening 33a is closed by the cover 34. Assembly of the subassembly of the TAS 24 is thus completed.

As described above, the second portion 72 of the first magnetism collecting ring 44, the circuit board 61, the driven gears 53, 54 of the rotation angle sensor 51, etc. are mounted in the accommodating chamber 33 of the sensor housing 31 through the opening 33a. Ease of assembly increases as the opening area of the opening 33a increases. However, there is a concern that rigidity of the sensor housing 31 decreases as the opening area of the opening 33a increases.

Reinforcement of Sensor

Accordingly, the present embodiment uses the following configuration as the sensor housing 31.

As shown in FIG. 5, a reinforcing member 91 is provided in the accommodating chamber 33. The reinforcing member 91 is located on the open side of the opening 33a (the opposite side of the sensor housing 31 from the insertion hole 32) with respect to the first portion 71 (the portion exposed to the inside of the accommodating chamber 33) of the first magnetism collecting ring 44.

As shown in FIG. 6, when the sensor housing 31 is viewed from the opening 33a side, the reinforcing member 91 is located in the middle in a width direction of the accommodating chamber 33 (the horizontal direction in FIG. 6) that is perpendicular to the axial direction of the pinion shaft 13. The reinforcing member 91 connects an inner top surface 33c (the lower inner wall surface in FIG. 6) of the accommodating chamber 33 and a portion of an inner bottom surface 33b (the upper inner wall surface in FIG. 6) of the accommodating chamber 33 that is located between the magnetism collecting protrusions 82a, 82b. With this configuration, the sensor housing 31 has sufficient rigidity even though the opening 33a has a sufficient opening area.

The first magnetism collecting ring 44 that is exposed to the inside of the accommodating chamber 33 is herein comprised of two separate portions, namely the first portion 71 and the second portion 72, in order to provide the reinforcing member 91 in the sensor housing 31.

For example, the first magnetism collecting ring 44 may be a single-piece member like the second magnetism collecting ring 45. However, this configuration makes it difficult to provide the reinforcing member 91 at the middle position in the accommodating chamber 33 described above. The reason for this is as follows.

The magnetism collecting protrusions 75a, 75b of the first magnetism collecting ring 44 need to be located on the opposite side of the circuit board 61 from the inner bottom surface of the accommodating chamber 33. The first magnetism collecting ring 44, which is a single-piece member, is therefore mounted in the accommodating chamber 33 after the circuit board 61 is mounted on the inner bottom surface of the accommodating chamber 33. At this time, the reinforcing member 91 that is present at the middle position of the accommodating chamber 33 described above hinders the first magnetism collecting ring 44, which is a single-piece member, from being mounted at an appropriate position.

In this regard, in the present embodiment, the first magnetism collecting ring 44 is divided into the first portion 71 and the second portion 72. Accordingly, the first magnetism collecting ring 44 can be appropriately mounted in the sensor housing 31 even when the reinforcing member 91 is present in the accommodating chamber 33. That is, since the annular first portion 71 can be mounted in advance in the sensor housing 31, it is not necessary to mount the first portion 71 in the sensor housing 31 through the opening 33a. Only the second portion 72 including the magnetism collecting protrusions 75a, 75b need be attached to the first portion 71 from the outside of the reinforcing member 91 through the opening 33a after the circuit board 61 is mounted in the accommodating chamber 33.

The second portion 72 is formed such that there is clearance 8 between the inner surface of the connecting portion 74 of the second portion 72 and the outer peripheral surface of the first portion 71 when the second portion 72 is attached to the outer peripheral surface of the first portion 71 via the fixed portions 73a, 73b. Setting the size of the clearance 8 according to the size of the reinforcing member 91 allows the second portion 72 to be attached to the first portion 71 even when the reinforcing member 91 is present. As shown in FIG. 7, the second portion 72 is attached to the first portion 71 so as to bypass the reinforcing member 91.

Effects of Embodiment

The present embodiment has the following effects.

(1) In the sensor housing 31, the reinforcing member 91 is provided in the accommodating chamber 33 that is open through the opening 33a. This configuration ensures that the sensor housing 31 has sufficient rigidity and ensures reliability as a product.

(2) The first magnetism collecting ring 44 exposed to the inside of the accommodating chamber 33 is divided into the annular first portion 71 and the second portion 72 including the magnetism collecting protrusions 75a, 75b. With this configuration, the first portion 71 can be mounted in advance in the sensor housing 31. It is therefore not necessary to mount the first portion 71 in the sensor housing 31 through the opening 33a. Only the second portion 72 need be attached to the first portion 71 from the outside of the reinforcing member 91 after the circuit board 61 is mounted in the accommodating chamber 33. Accordingly, the first magnetism collecting ring 44 can be appropriately mounted in the sensor housing 31 even when the reinforcing member 91 is present in the accommodating chamber 33.

(3) When the sensor housing 31 is viewed from the opening 33a side, the reinforcing member 91 is located at the middle position in the width direction of the accommodating chamber 33 that is perpendicular to the axial direction of the pinion shaft 13. This configuration improves rigidity of the sensor housing 31 in a balanced manner.

Other Embodiments

The above embodiment may be modified as follows.

The reinforcing member 91 may not be provided at the middle position of the opening 33*a*. The reinforcing member 91 may be provided at an appropriate position in the sensor housing 31 (the accommodating chamber 33) as long as it does not hinder assembly of the TAS 24. A plurality of reinforcing members may be provided in the sensor housing 31 (the accommodating chamber 33). The reinforcing member may have any appropriate shape such as a cylindrical shape or a plate shape.

In the above embodiment, the two sets of magnetism collecting protrusions 75*a*, 82*a* and magnetism collecting protrusions 75*b*, 82*b* are provided for fail-safe purposes. However, the disclosure may use a configuration having one set of magnetism collecting protrusions 75*a*, 82*a* or magnetism collecting protrusions 75*b*, 82*b*.

In the above embodiment, the TAS 24 is illustrated as an example of the sensor. However, the sensor may be a simple torque sensor 41, namely the TAS 24 having the rotation angle sensor 51 omitted therefrom. This simple torque sensor 41 solves a problem similar to that solved by the TAS 24.

The present embodiment is described with respect to an example in which the TAS 24 or the simple torque sensor 41 is mounted on a steering device of a vehicle. However, the disclosure may be applied to other devices that are mounted in a vehicle and have a shaft (rotary shaft). Application of the TAS 24 or the simple torque sensor 41 is not limited to application to devices that are mounted in a vehicle.

What is claimed is:

1. A sensor comprising:
    a permanent magnet mounted on a shaft that is subjected to detection by the sensor such that the permanent magnet is rotatable with the shaft;
    a magnetic yoke configured so that a rotational position of the magnetic yoke relative to the permanent magnet changes according to torsion of the shaft;
    a magnetism collecting ring configured to surround the magnetic yoke and collect a magnetic flux from the magnetic yoke;
    a circuit board on which a magnetic sensor that detects the magnetic flux collected by the magnetism collecting ring is mounted; and
    a sensor housing through which the shaft is inserted and that accommodates the permanent magnet, the magnetic yoke, the magnetism collecting ring, and the circuit board, wherein
    the sensor housing has an accommodating chamber accommodating at least the circuit board via an opening that opens in a direction crossing an axial direction of the shaft, the accommodating chamber having a box shape,
    a reinforcing member connecting two wall surfaces of the accommodating chamber that face each other in the axial direction of the shaft is provided in the accommodating chamber,
    the magnetism collecting ring includes a first magnetism collecting ring and a second magnetism collecting ring that are arranged next to each other in the axial direction of the shaft,
        each of the first magnetism collecting ring and the second magnetism collecting ring includes a first portion surrounding the magnetic yoke and a second portion protruding outward in a radial direction of the first portion, the second portions facing each other in the axial direction of the shaft, and the magnetic sensor mounted on the circuit board being interposed between the second portions,
        the first magnetism collecting ring is located closer to a surface of the circuit board on which the magnetic sensor is mounted, the first portion and the second portion of the first magnetism collecting ring being separate members, and
        the first portion of the first magnetism collecting ring is mounted at a position inside the reinforcing member, and the second portion of the first magnetism collecting ring is attached to the first portion of the first magnetism collecting ring from outside of the reinforcing member such that the reinforcing member is interposed between the first portion and the second portion.

2. The sensor according to claim 1, wherein when the sensor housing is viewed from the opening side, the reinforcing member is located at a middle position in a width direction of the accommodating chamber, the width direction being perpendicular to the axial direction of the shaft.

3. The sensor according to claim 1, wherein a rotation angle sensor that detects a rotation angle of the shaft is mounted in the sensor housing.

4. The sensor according to claim 1, wherein the shaft is a pinion shaft meshing with a steered shaft that steers a steered wheel of a vehicle.

* * * * *